United States Patent
Johnson

(10) Patent No.: US 6,366,856 B1
(45) Date of Patent: Apr. 2, 2002

(54) METHOD AND APPARATUS FOR ORIENTING A MAP DISPLAY IN A MOBILE OR PORTABLE DEVICE

(75) Inventor: Paul Johnson, Escondido, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/718,267

(22) Filed: Nov. 21, 2000

(51) Int. Cl.⁷ .............................. G01S 5/02; G01C 21/00
(52) U.S. Cl. ..................... 701/213; 701/200; 701/207; 701/224
(58) Field of Search .............................. 701/200, 201, 701/207, 208, 210, 211, 213, 220, 224; 340/988, 990, 995; 73/178 R; 342/357, 450, 457

(56) References Cited

U.S. PATENT DOCUMENTS 5,948,043 A * 9/1999 Mathis ........................ 701/208
6,049,755 A * 4/2000 Lou et al. .................... 701/207
6,154,703 A * 11/2000 Nakai et al. ................. 701/200

* cited by examiner

Primary Examiner—William A. Cuchlinski, Jr.
Assistant Examiner—Arthur D. Donnelly
(74) Attorney, Agent, or Firm—Philip Wadsworth; Charles Brown; Bruce Greenhaus

(57) ABSTRACT

A method apparatus for orienting a map display in a mobile or portable device. An electronic compass is integrated with a hand-held portable or mobile mapping device and an electronic compass bearing is used to calculate an offset value with respect to the map default orientation. The map is thus reoriented in the display to the direction of the device. In an alternative embodiment, a GPS receiver is also integrated with the device. A heading fix is calculated from two or more GPS position fixes to determine orientation of the device. When a heading fix is unavailable, such as at initial start-up of the device, a compass heading is used in lieu of the GPS heading fix to orient the map on a display.

10 Claims, 5 Drawing Sheets

METHOD AND APPARATUS FOR ORIENTING A MAP DISPLAY IN A MOBILE OR PORTABLE DEVICE

BACKGROUND OF THE INVENTION

1. Field of the Invention

The present invention relates to electronic mapping technology. More specifically, the present invention relates to systems and methods for utilizing an electronic compass or a GPS directional fix to orient a map in the display of an electronic device so as to be consistent with the orientation of the device with respect to Earth.

2. Description of the Related Art

The use of computer mapping technology has been growing dramatically in recent years. The widespread availability of accurate electronic maps and the low cost of processing and display technology have been driving forces behind this trend. Maps are available on fixed media, within memory, and over networks, such as the Internet. Mapping software systems with GPS based position determination are now deployed in motor vehicles such that localized maps are readily available to users. An example of this implementation is in rental cars where detailed maps and driving directions are provided to the user in a mobile mapping device installed in the rental car.

In the GPS implementation, a present location point is displayed on the map, based on a GPS position fix, such that the user's location is plotted on the map as they move from place to place. The orientation of the user's movement can be determined by calculating the general direction of movement from position fix to position fix. However, since the resolution accuracy of the GPS system is limited, a small amount of movement cannot be reliably determined, and thus orientation cannot be accurately calculated.

Traditionally, the orientation of a map has been with north at the top. The user is left to abstract this orientation to the physical world. As mapping technology has become more readily available and more responsive to a user's particular environment, this orientation tradition has become limiting. For example, in a hand-held portable device where the map is displayed with a pointer to the user's present location, the user has a tightly interactive relationship with the map and the physical environment. The user studies the map and then views the physical environment to locate and track their position and destination. When the map is always displayed with north on the top, it does not reflect the user's actual view of the area surrounding them. It is preferable in such situations that the map be reoriented to display on top, what is directly in front of the users. Thus, the intimate interactive relationship is improved and the map more readily beneficial to the user.

While the foregoing reorientation of a map display can be accomplished with GPS based systems, the positioning accuracy limitations of the GPS system causes problems. When a mapping device is turned on, there can be no immediate orientation because the GPS approach requires two successive position fixes in order to determine a heading fix. In addition, there must be sufficient movement to overcome the inherent measurement inaccuracies of the GPS systems. Also, when the device motion slows to the point where the movement between successive fixes is less than the resolution of the GPS system, then a degree of uncertainty arises as to what the current orientation, or heading is.

Thus there is a need in the art for a method and apparatus for orienting a map display in a mobile or portable device.

SUMMARY OF THE INVENTION

The need in the art is addressed by the apparatus and methods of the present invention. The inventive apparatus is a mobile device with a map memory and a compass operable to output compass headings. A controller is coupled to the memory and operates to recall a map therefrom. The controller is also coupled to the compass and is operable to read a compass heading therefrom. A display is also coupled to the controller. The controller calculates an offset value indicative of the difference between the compass heading and the orientation of the map and writes the map to the display in accordance with the offset value.

In a further refinement, the controller repeats the calculation of the offset value and rewrites the map to the display in accordance therewith. The controller repeats this periodically. In a further refinement, the controller repeats when the offset value indicative of the difference between the compass heading and the orientation of the map exceeds a threshold value.

In another embodiment of the present invention, the mobile device comprises a map memory, a GPS receiver operable to output position fixes, and a compass operable to output compass headings. A controller is coupled to the memory and operable to recall a map therefrom, and the controller is coupled to the GPS receiver and operable to calculate a heading fix based on a first and a second position fix read therefrom. The controller is also coupled to the compass and operable to read a compass heading therefrom. A display is also coupled to the controller. The controller calculates a map offset value indicative of the difference between the heading fix and the orientation of the map. However, if the heading fix is unavailable, the controller calculates an offset value indicative of the difference between the compass heading and the orientation of the map. Finally, the controller writes the map to the display in accordance with the offset value, however determined.

In a refinement of the foregoing embodiment, the controller repeats the calculation of the offset value and rewrites the map to the display in accordance therewith. Further, the controller repeats this periodically. In a further refinement, the controller repeats when the second GPS position fix is offset from said first GPS position fix by at least a threshold value. In another refinement, the controller repeats when the offset value indicative of the difference between the compass heading and the orientation of the map exceeds a threshold value.

The present invention also teaches several methods of operation. These include a method of orienting a map display in a mobile device including the steps of reading a compass heading indicative of the orientation of the mobile device and calculating an offset value indicative of the difference between the compass heading and the orientation of a map. Then, writing the map to a display in accordance with the offset value.

A refinement of this method includes the additional step of updating the map orientation by repeating the reading, calculating and writing steps. In a further refinement, the updating step is repeated periodically. In a further refinement, the writing step is executed when the offset value indicative of the difference between the compass heading and the orientation of a map exceeds a threshold value.

Another method of orienting a map in a mobile device display includes the steps of reading a first and a second GPS location fix and calculating a GPS heading fix indicative of the direction of motion of the mobile device. Upon determining that a GPS heading fix is unavailable or indeterminate due to accuracy or other reasons, the invention includes the step of reading a compass heading indicative of the orientation of the mobile device. Then, the inventive method calculates an offset value indicative of the difference between the GPS heading fix and the orientation of a map. If this is not available or is indeterminate due to accuracy or other reasons, the inventive method otherwise calculates an offset value indicative of the difference between the compass heading and the orientation of a map. Finally, the method writes the map to a display in accordance with the offset value.

A refinement of this method is to update the map orientation by repeating the reading, calculating and writing steps. In a further refinement, the updating step is repeated periodically. In a further refinement, the updating step is repeated when the second GPS position fix is offset from the first GPS position fix by at least a threshold value. In another refinement, the writing step is executed when the offset value indicative of the difference between the compass heading and the orientation of a map exceeds a threshold value.

DESCRIPTION OF THE INVENTION

Illustrative embodiments and exemplary applications will now be described with reference to the accompanying drawings to disclose the advantageous teachings of the present invention. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The illustrative embodiments of the present invention are generally implemented within hand-held portable or mobile-vehicular devices that provide map display guidance information. However, it is applicable to any device that is not fixed in position. Such devices may be preprogrammed with map data in a memory, or the map data may be placed into the memory while the device is in operation. For example, portable memory cards may be supplied to the user, which are inserted into the device so that the map data can be altered to suit the particular geographic location that the device will operate within. Alternatively, the map data may be supplied through a communications link from a network, such as the Internet. In an implementation where a cellular or PCS telephone comprises the present invention, the map information may be received in the form of data packets from the Internet, via the cellular or PCS communications protocol and then are stored into the memory of the device.

Figure 1:
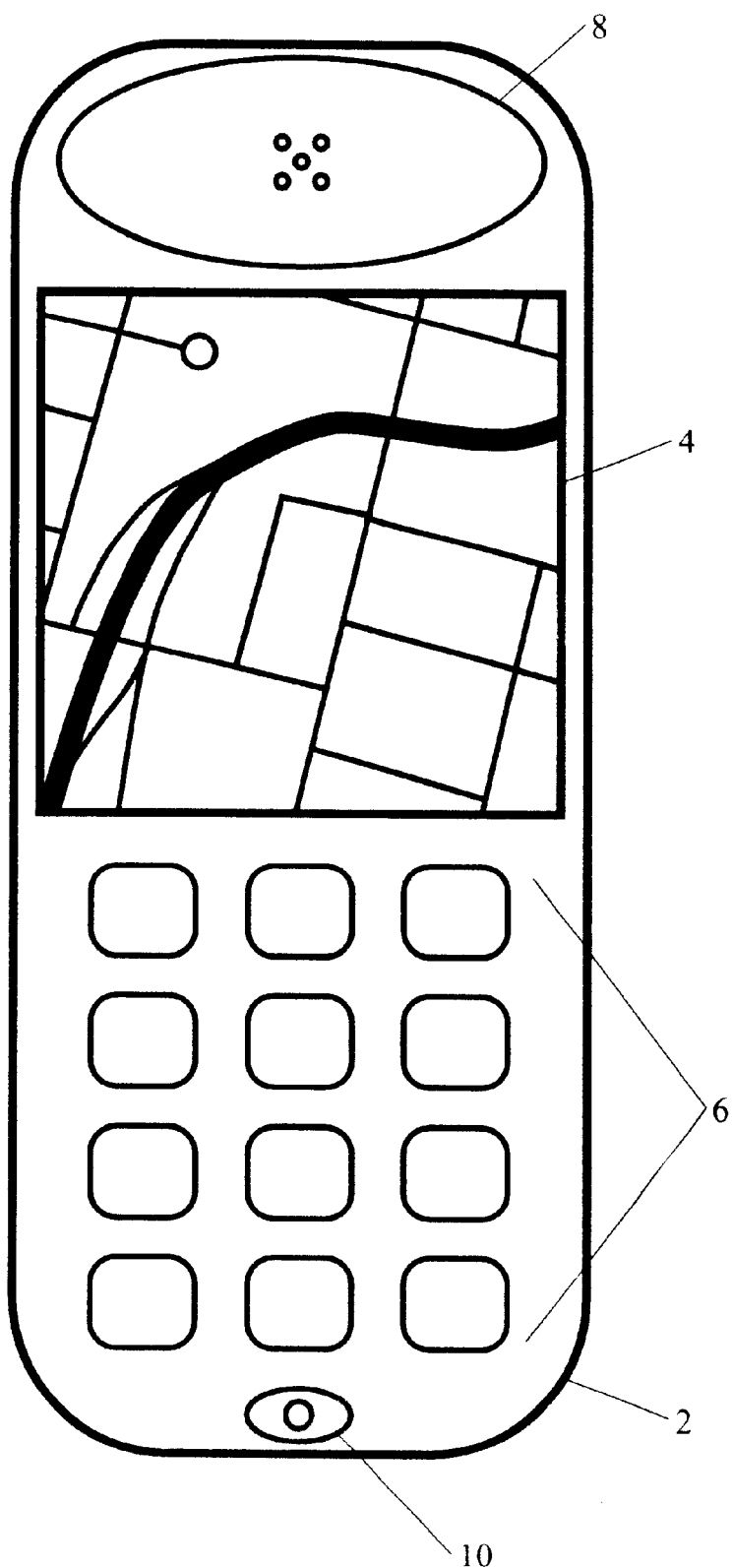
FIG. 1 is a drawing of an illustrative embodiment portable device implementation of the present invention.

Reference is direct to FIG. 1, which is a drawing of an illustrative embodiment portable device implementation of the present invention in the form of a wireless telephone 2 having the map display function therein. The wireless telephone 2 has a microphone 10 and earphone 8 for use in the conventional wireless telephone mode of operation. The wireless telephone 2 also comprises a keypad 6 that allows the user to operate the wireless telephone 6 in the usual fashion. The keypad also allows the user to control the mapping functions such as selecting the region of the map to be displayed zooming the map to display the scale desired by the user and so forth, as is understood by those of ordinary skill in the art. The wireless telephone 2 also comprises a display 4 that is adapted to display the map information. Thus, when a user enables the mapping function by accessing the keypad 6 of the wireless telephone 2, the map is displayed on display 4.

It is the convention in the mapping arts that maps are displayed with north to the top of the map or map display. Thus, the north-up configuration is the default orientation of most maps. This convention is very useful when the map is contemplated in the abstract as a user considers the geographic relationship of places, roads and other geographical objects. However, with the advent of portable mapping technology, the level of abstraction when contemplating a map is reduced more directly to the physical world. In a fashion similar to the use of a paper map while driving an automobile where the user may rotate the map to align it with the actual direction of travel of the vehicle, the present invention facilitates the virtual rotation of the paper map within the display of the mobile device that embodies the mapping function.

Figure 2A:
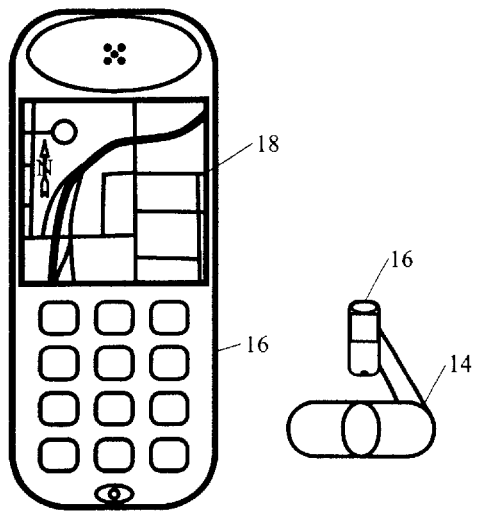
FIG. 2A is an illustration of the function of an illustrative embodiment of the present invention.

Reference is directed to FIGS. 2A through 2D, which are a series of illustrations of the function of an illustrative embodiment of the present invention. Note that in all of FIGS. 2A through 2D, the direction north is represented as the top of the drawing page, as indicated by north arrow 12. In FIG. 2A, a user 14 stands holding an illustrative embodiment wireless telephone 16 that comprises the map orientation apparatus and method of the present invention (hereinafter the 'moveable device'). The detail view of mobile device 16 shows the map oriented consistent with the direction the user is facing, e.g. north, and that north is oriented on the top of map 18.

Figure 2B:
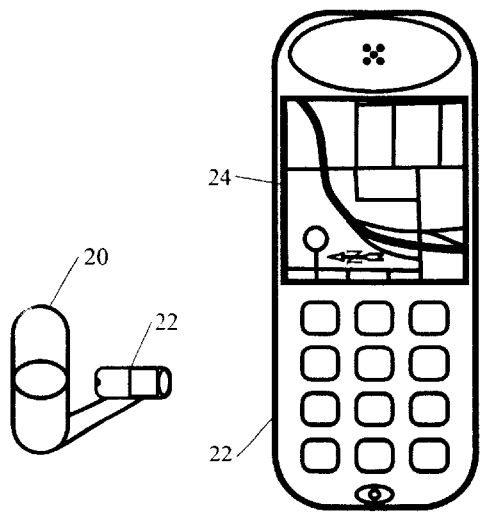
FIG. 2B is an illustration of the function of an illustrative embodiment of the present invention.
Figure 2D:
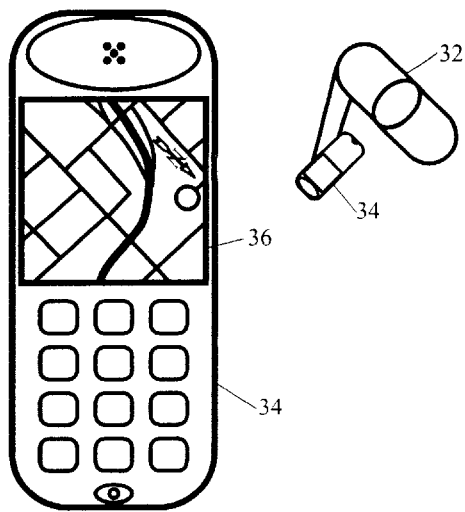
FIG. 2D is an illustration of the function of an illustrative embodiment of the present invention.

In FIG. 2B, a user 20 stands holding the mobile device 22 and facing in an easterly direction. As the present invention has already responded to the change is direction (to be more fully discussed hereinafter) the map 24 orientation has been changed by an offset value. The mobile device 22 has determined that the direction the unit is now held has been rotated through ninety degrees clockwise, and has thus determined that the offset from the default map direction (north) to the presently held orientation is ninety degrees counter-clockwise. An offset value of ninety degrees counter-clockwise has therefore been calculated and the map 24 has been re-oriented by rotating the map picture elements, or pixels, according to this offset. As can be seen in FIG. 2B, the map orientation has been rotated ninety degrees counter-clockwise such that the top of the map 24 indicates what is directly in front of the user 20 (to the east), and not the default direction of north.

Figure 2C:
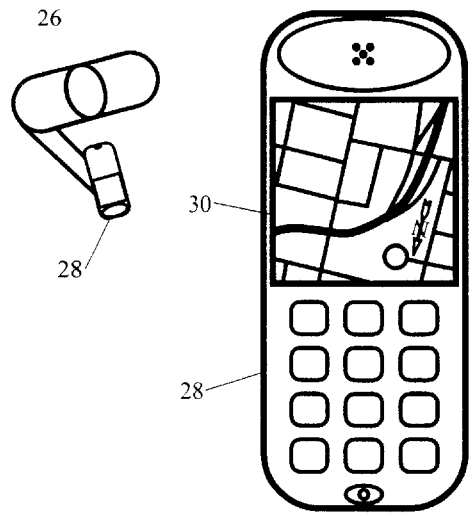
FIG. 2C is an illustration of the function of an illustrative embodiment of the present invention.

Respecting FIGS. 2C, it can been seen that a user 26 holds the mobile device 28 and is facing in a south-southeasterly direction. The suitable offset angle has been calculated and the map rotated accordingly to yield the map orientation 30 shown in the detail view of mobile device 28. The mobile device 28 has determined that the direction the unit is now held has been rotated through one hundred and sixty degrees clockwise, and has thus determined that the offset from the default map direction (north) to the presently held orientation is one hundred and sixty degrees counter-clockwise. Likewise, in FIG. 2D, the user 32 stands facing a southwesterly direction holding mobile device 34. In the detailed view of mobile device 34, the map 36 orientation is shown to have been rotated through two-hundred and twenty-five degrees counter-clockwise. The orientation of map 36 should be rotated counter-clockwise by 90 degrees. Thus it can be seen that the present invention orients and reorients the map display according to an offset angle measured as the difference between a default map direction and the measured direction of the mobile device, or as the previously calculated offset value and a newly measured and calculated offset value.

The relationship between the default map orientation and the measured mobile device is called the offset angle. Traditionally, the default orientation of a map is north. However, this is a mere convention and any suitable reference may be contemplated and employed by those skilled in the art. Similarly, the top of the map display is considered the reference point for the map default orientation; however, any suitable point of reference may be employed.

Having a map available to display, it is necessary to determine the mobile device orientation in order to calculate the offset angle needed for rotation of the map as it is written to the display. There are two techniques employed for determining the orientation of the mobile device in the present invention and each has its advantages. One approach is to employ a GPS (Global Positioning System) receiver that is operable to output position fixes of the mobile device from time to time. Position fixes in a GPS receiver include a three-dimensional coordinate and time reference of the receiver. Typically, this is latitude, longitude, altitude and GPS time. The accuracy of these measurements in a commercial GPS receiver is within 100 meters, based on a root mean squared error calculation. The concepts of GPS operation and accuracy are well understood by those of ordinary skill in the art.

The GPS position fix does not provide device orientation information in and of itself. However, if the mobile device is moving over a period of time and at least two position fixes are taken, the trend of motion can be determined through calculations, thus indicating the direction of travel of the mobile device. Thus, orientation can be inferred as the direction of travel. This is a useful approach to orientation determination, especially in a mobile environment, because the trend of motion does not reflect the minor deviations from the path of motion, such as navigating around an obstacle. The display orientation aligns with the trend of motion and does not reorient itself with minor course deviations. In other words, the top of the map stays oriented with the general trend of motion and not the instantaneous direction the mobile device is pointed.

There are some limitations in orientation determination done using two successive GPS position fixes. One limitation is the situation where the mobile device is initially activated and no motion has yet occurred. In this case, the two successive readings will show no motion and thus orientation determination is not possible. Another limitation is the case where the total movement is less than the measurement accuracy of the GPS position fix, i.e. less than 100 meters. While an orientation calculation can be made, it is uncertain as to whether it accurately represents the trend of motion of the device. A third limitation is the case where motion is so slow that successive readings are not spaced apart far enough to yield an accurate motion trend line. As will be discussed more fully herein below, the present invention solves these problems in a novel approach.

Another alternative to orientation measurement is to employ an electronic compass to measure the instantaneous orientation of the mobile device with respect to the magnetic north pole of Earth. Electronic compasses are know in the art and generally output a signal indicative of the compass heading of the device into which they are incorporated. An advantage of this approach is that a single reading can determine the orientation of the device. However, a disadvantage is that the reading is sensitive to all deviations in the course of motion of the device. The present invention includes the feature of advantageously combining these two orientation determination approaches to alleviate this issue when needed.

Figure 3:
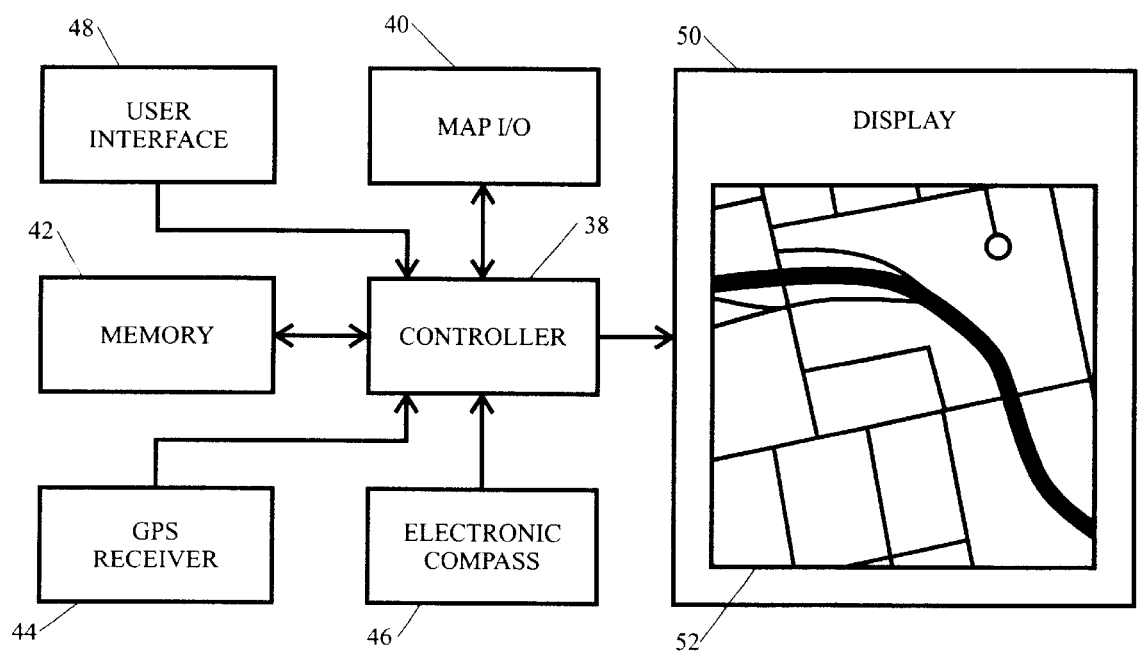
FIG. 3 is a functional block diagram of an illustrative system of the present invention.

Reference is directed to FIG. 3, which is a functional block diagram of an illustrative embodiment mobile device of the present invention. The mobile device includes a GPS receiver 44 that is operable to output a GPS position fix, as was discussed herein before. The GPS receiver is coupled to a controller 38, which is a microprocessor or microcontroller of the variety typically used in portable, low power devices. Such controllers are well understood by those skilled in the art. An electronic compass 46 may be of any suitable variety including, but not limited to, Hall effect sensors, electro-resistive devices, or current loop sensor type electronic compasses. The compass could also employ an electromechanical structure that reads the position of a magnetic indicator, such as in the conventional magnetic compass. Also, the compass orientation could be derived from an inertial device, such as a gyroscope or equivalent thereof. In any event, the compass outputs a signal indicative of the magnetic heading of the mobile device. The controller is operable to read and process both the GPS position fixes and the compass heading. In addition, the controller is operable to perform the calculations necessary to convert two, or more, GPS position fixes into a heading fix. Such calculations are well understood by those of ordinary skill in the art.

The mobile device in FIG. 3 also includes a memory 42 for storing a digital representation of one or more maps. Any suitable system of defining a map digitally may be employed, including but not limited to bitmap images, jpeg images, HTML graphics, and so forth. All that is required is some means for identifying a reference orientation of the map so that an offset to the orientation can be later calculated. Orientation may be based on the conventional identification of north, or any other directional orientation as may be devised from time to time. This illustrative embodiment also includes a map input/output circuit 40. In some applications, the map may be programmed into the memory 42 at the time of manufacturing or initial programming. Or, the map input-output circuit 40 may be utilized so that the map or maps in memory 42 can be changed and updated from time to time by the user. Any suitable input or output may be utilized. By way of example, and not limitation, these may include any of the variety of memory cards, floppy disks, compact hard disk drives, CD-ROM drives, or serial or parallel interfaces to external devices or networks, whether interfaced by wireline, fiber optics or radio. The external network may include the Internet or other private or public network.

The mobile device illustrated in FIG. 3 also includes a suitable user interface 48 to allow access to the various functions of the device as well as a graphical display 50. The display 50 may be an LCD display or other technology suitable for displaying graphical images, such as a map. The display is used to display the reoriented map 52 after the controller has calculated the offset value and rotated the image to the appropriate position. The design and use of such displays, in conjunction with controllers is well understood by those skilled in the art.

Figure 4:
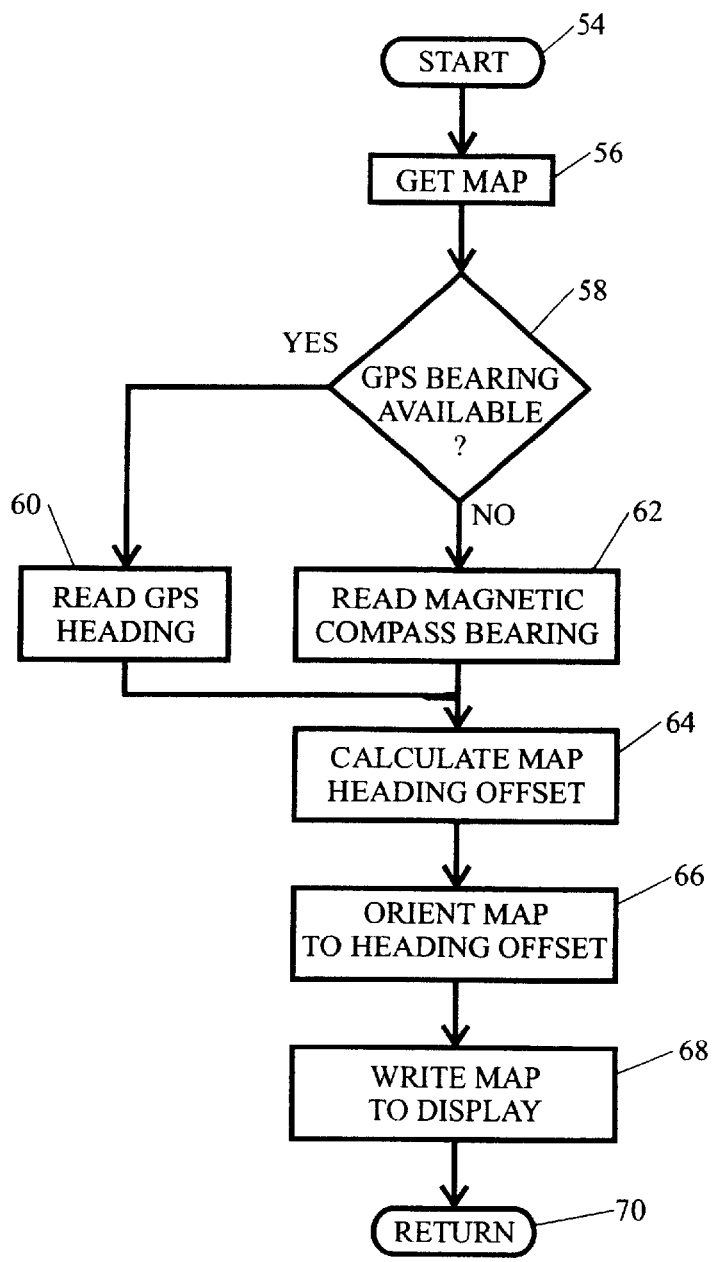
FIG. 4 is a functional block diagram of an illustrative embodiment of the present invention.

Reference is directed to FIG. 4, which is a functional block diagram of an illustrative embodiment flow diagram of the present invention. The process begins at step 54 and proceeds to step 56 where the processor accesses the map. At step 58, the processor checks to determine if a GPS position fix is available. In addition to the mere presence of a GPS receiver, the processor determines if there has been sufficient movement between successive position fixes to enable an accurate determination of a GPS heading, as was discussed herein before. The GPS position fixes are taken periodically and followed by the calculation of a GPS heading. If a GPS heading can be calculated, it is read at step 60 and flow continues to step 64, which will be more fully described hereinafter. On the other hand, at step 58, if no GPS heading can be determined, then the bearing of a magnetic compass is read at step 62. This aspect of the process is an important advancement because it solves the aforementioned problems associated with GPS heading determinations. In fact, it may be suitable for entirely replacing GPS heading determination in devices not seriously affected by discontinuous motions. Flow proceeds to step 64. At step 64, whether the heading was determined by GPS fix or by compass heading, the offset value for the map is calculated. The offset value is the difference in the default heading and the measured heading and may be expressed in any suitable units. In the illustrative embodiment, magnetic compass headings are employed with the default being geographic north, and the units are degrees.

Having determined the offset value, the map is oriented to the offset angle at step 66 and written to the display at step 68. The methods for reorienting a graphical image into a display are understood by those skilled in the art. Any suitable approach may be employed in the present invention. The process completes at step 70.

Figure 5:
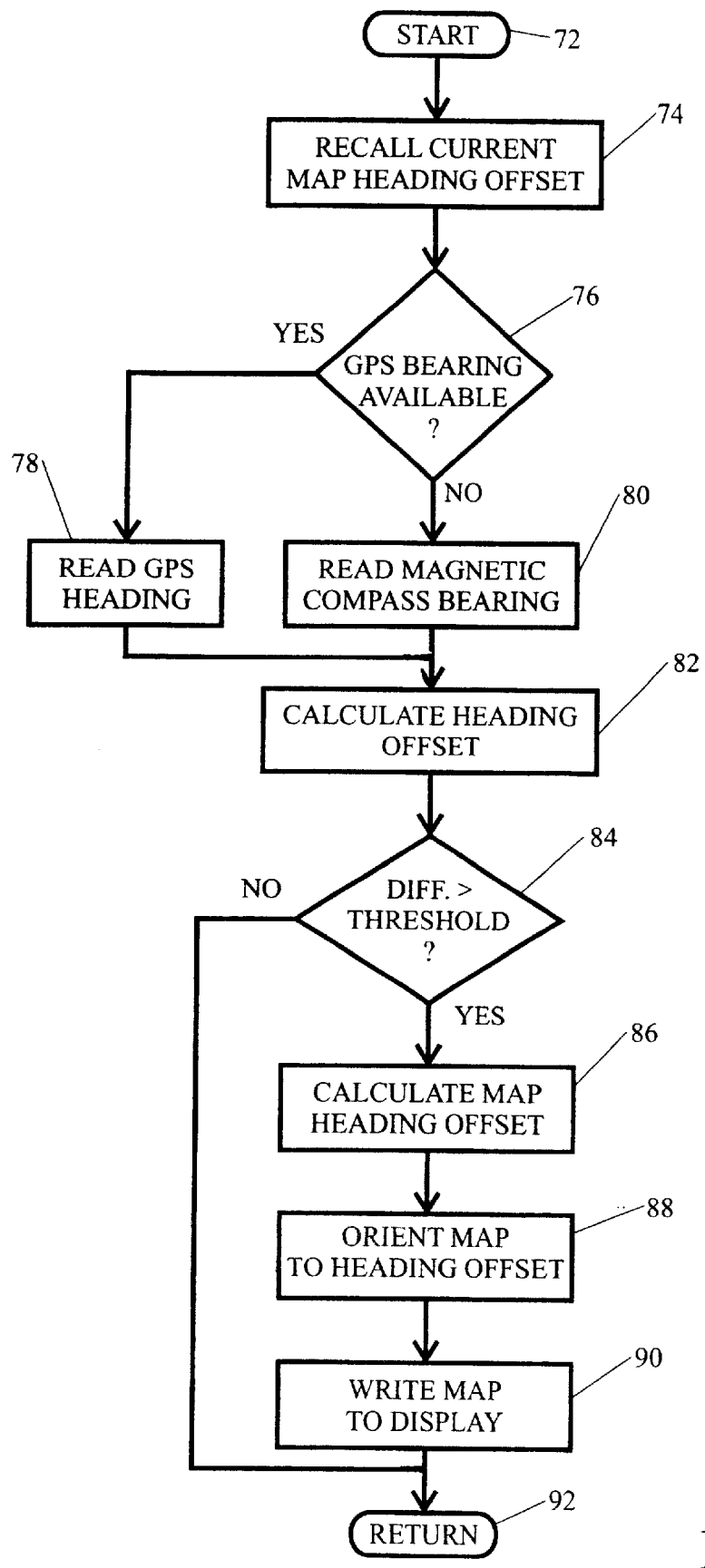
FIG. 5 is a functional block diagram of an illustrative embodiment of the present invention.

Reference is directed to FIG. 5, which is a functional block diagram of an illustrative embodiment of the present invention. The process in FIG. 5 differs from that in FIG. 4 in that the map orientation is updated from a previously oriented map display, and a threshold measurement is added to avoid reorientation where the change is direction does not meet a minimum threshold value. This process is useful in tracking the motion and changes of direction of the mobile device from time to time. The process begins at step 72 and proceeds to step 74 where the current map heading, or current offset value is recalled. A test to determine if a suitable GPS bearing is available is made at step 76, as was described previously respecting FIG. 4. If a GPS heading can be calculated, it is read at step 78 and flow proceeds to step 82. If a GPS heading is not available, then a magnetic compass heading is read at step 80. In either case, the heading offset value is calculated at step 82 to determine the current heading orientation for display. It should be noted that a very small change in heading may not be meaningful and that updating the display in accordance therewith may cause undesirable display jitter or display noise. Thus, at step 84, a test is made to determine whether or not the difference between the prior map orientation offset value and the new offset value exceeds a threshold value. The magnitude of the threshold value is arbitrary and should be selected based upon the particular mobile device and operating environment, as well as user considerations. If the difference is less than the threshold value no change is necessary and the process ends at step 92. On the other hand, if the new offset heading exceeds the threshold, then the new map heading offset value is calculated at step 86 and the map is reoriented in accordance therewith at step 88. The map is then written to the display at step 90 and the process ends at step 92.

Thus, the present invention has been described herein with reference to a particular embodiment for a particular application. It is therefore intended by the appended claims to cover any and all such applications, modifications and embodiments within the scope of the present invention.

Accordingly,

What is claimed is:

1. A mobile device comprising:

a map memory;

a GPS receiver operable to output position fixes;

a compass operable to output compass headings;

a controller coupled to said memory and operable to recall a map therefrom, and coupled to said GPS receiver and operable to calculate a heading fix based on a first and a second position fix read therefrom, and coupled to said compass and operable to read a compass heading therefrom;

a display coupled to said controller, and wherein said controller calculates a map offset value indicative of the difference between said heading fix and the orientation of said map, and if said heading fix is unavailable, said controller calculates an offset value indicative of the difference between said compass heading and the orientation of said map and said controller is operable to write said map to said display in accordance with said offset value.

2. The mobile device of claim 1 wherein said controller repeats the calculation of said offset value and rewrites said map to said display in accordance therewith.

3. The mobile device of claim 2 wherein said controller repeats periodically.

4. The mobile device of claim 2 wherein said controller repeats when said second GPS position fix is offset from said first GPS position fix by at least a threshold value.

5. The mobile device of claim 2 wherein said controller repeats when said offset value indicative of the difference between the compass heading and the orientation of a map exceeds a threshold value.

6. A method of orienting a map display in a mobile device, comprising the steps of:

reading a first and a second GPS location fix and calculating a GPS heading fix indicative of the direction of motion of the mobile device;

upon determining that a GPS heading fix is unavailable, reading a compass heading indicative of the orientation of the mobile device;

calculating an offset value indicative of the difference between said GPS heading fix and the orientation of a map;

otherwise calculating an offset value indicative of the difference between the compass heading and the orientation of a map, and writing said map to a display in accordance with said offset value.

7. The method of claim 6 further comprising the steps of:

updating the map orientation by repeating said reading, calculating and writing steps.

8. The method of claim 7 wherein said updating step is repeated periodically.

9. The method of claim 7 wherein said updating step is repeated when said second GPS position fix is offset from said first GPS position fix by at least a threshold value.

10. The method of claim 6 wherein said writing step is executed when said offset value indicative of the difference between the compass heading and the orientation of a map exceeds a threshold value.

* * * * *